(12) United States Patent
Cajolet et al.

(10) Patent No.: US 7,336,264 B2
(45) Date of Patent: *Feb. 26, 2008

(54) METHOD AND SYSTEM FOR EDITING OR MODIFYING 3D ANIMATIONS IN A NON-LINEAR EDITING ENVIRONMENT

(75) Inventors: Claude Cajolet, Montreal (CA); Réjean Gagné, Montreal (CA)

(73) Assignee: Avid Technology, Inc., Tewksbury, MA (US)

( * ) Notice: Subject to any disclaimer, the term of this patent is extended or adjusted under 35 U.S.C. 154(b) by 128 days.

This patent is subject to a terminal disclaimer.

(21) Appl. No.: 10/718,161

(22) Filed: Nov. 20, 2003

(65) Prior Publication Data

US 2004/0100482 A1 May 27, 2004

Related U.S. Application Data

(63) Continuation of application No. 09/049,066, filed on Mar. 27, 1998, now Pat. No. 6,686,918.

(60) Provisional application No. 60/054,590, filed on Aug. 1, 1997.

(51) Int. Cl.
G09G 5/00 (2006.01)

(52) U.S. Cl. ............... 345/173; 345/619; 345/629; 345/634; 345/587

(58) Field of Classification Search ........ 345/419–428, 345/473–475, 173, 589, 619, 539, 629, 501, 345/557, 634, 587, 426, 427; 715/722–725; 386/52–55
See application file for complete search history.

(56) References Cited

U.S. PATENT DOCUMENTS

| | | | | |
|---|---|---|---|---|
| 5,261,041 A | * | 11/1993 | Susman | 345/473 |
| 5,388,197 A | * | 2/1995 | Rayner | 715/723 |
| 5,594,856 A | * | 1/1997 | Girard | 345/473 |
| 5,748,199 A | * | 5/1998 | Palm | 345/473 |
| 5,781,188 A | * | 7/1998 | Amiot et al. | 715/723 |
| 5,801,717 A | * | 9/1998 | Engstrom et al. | 345/539 |
| 5,838,938 A | * | 11/1998 | Morgan | 715/723 |
| 5,844,569 A | * | 12/1998 | Eisler et al. | 345/619 |
| 5,920,495 A | * | 7/1999 | Hicok et al. | 708/308 |
| 5,963,215 A | * | 10/1999 | Rosenzweig | 345/649 |
| 6,008,816 A | * | 12/1999 | Eisler et al. | 345/589 |
| 6,016,150 A | * | 1/2000 | Lengyel et al. | 345/426 |
| 6,023,703 A | * | 2/2000 | Hill | 707/100 |
| 6,058,397 A | * | 5/2000 | Barrus et al. | 707/104.1 |
| 6,064,393 A | * | 5/2000 | Lengyel et al. | 345/427 |
| 6,243,706 B1 | * | 6/2001 | Moreau et al. | 707/101 |
| 6,329,994 B1 | * | 12/2001 | Gever et al. | 345/473 |
| 2001/0043219 A1 | * | 11/2001 | Robotham et al. | 345/474 |
| 2004/0117730 A1 | * | 6/2004 | Ibrahim et al. | 715/500.1 |

* cited by examiner

*Primary Examiner*—Prabodh Dharia
(74) *Attorney, Agent, or Firm*—Peter J. Gordon

(57) ABSTRACT

A non-linear editing (NLE) system for editing and/or modifying 3D animation information comprises elements represented by clip objects which can be positioned and/or manipulated relative to a time line. The elements can comprise conventional 1D (audio) or 2D (video) information or can comprise 3D animation information which can include animation objects and animation parameters associated with them, as well as 2D renderings of those objects. Positioning and/or manipulation of clip objects representing 3D animation elements can result in alteration of the 2D rendering and or re-rendering of the 3D information, as appropriate.

7 Claims, 5 Drawing Sheets

METHOD AND SYSTEM FOR EDITING OR MODIFYING 3D ANIMATIONS IN A NON-LINEAR EDITING ENVIRONMENT

CROSS-REFERENCE TO RELATED APPLICATIONS

This application claims priority to and the benefit of the filing date under 35 U.S.C. §120, and is a continuation application of, pplication Ser. No. 09/049,066, filed on Mar. 27, 1998, now U.S. Pat. 6,686,918, which is a nonprovisional application of provisional application Ser. No. 60/054,590, filed on Aug. 1, 1997, now abandoned. This application also claims priority to and the benefit of the filing date under 35 U.S.C §119 of Provisional application Ser. No. 60/054,590, filed on Aug. 1, 1997, abandoned. Both of these applications which are incorporated herein by reference.

FIELD OF INVENTION

The present invention relates to a system and method for editing or modifying 3D animations. In particular, the present invention relates to a non-linear editing system and method for editing and/or modifying 3D animations.

BACKGROUND OF INVENTION

Non-linear editing (NLE) systems are known for video (2D) and audio (sometimes referred to as "1D") systems. NLE systems for video and/or audio include systems manufactured by AVID, Quantel and others. Non-linear video editing systems allow a user to join, arrange and/or modify digital or digitized source information to create a final cut, or edit, for rendering to appropriate storage media or output. The systems are non-linear in that the sources are not generally limited to being accessed in a linear manner, but instead permit random access. For example, the last three seconds of a ten second digital video source can be accessed without accessing the first seven seconds, or individual frames in the digital video can be accessed and/or combined as desired. Non-linear audio editing systems allow a user to easily and efficiently manipulate digital or digitized audio sources to produce a desired final output, often referred to as a final edit of "cut".

In practice, an NLE system for video can, for example, be used to construct the video portion of a television advertisement for a new model of car, by connecting digitized source video of the new car driving on a country road, digital source video of a driver in the car and digitized source video of the car in a wind test tunnel with engineers standing about it. An NLE system for audio can be used to create an audio soundtrack for this advertisement, comprising a selection of classical music, in digital from, mixed with a narrator's voice-over, also in digital form, discussing the features of the car and various sound effects sources which are also mixed, at appropriate time points, with the music and narration sources. The video and audio final edits are than rendered to an appropriate sink, such as a VTR, RAID array, or a monitor, to obtain the finished commercial.

NLE editors represent the available sources (video or audio) as objects in a graphical user interface (GUI), the objects commonly being referred to as clips, which are positioned and/or manipulated with respect to a time line for the edit. Various effects, such as fades, dissolves, wipes, blends, etc. can be applied to the clips to obtain the final edit.

Known techniques for editing 3D animations have comprised the rendering of the 3D animation to 2D media (video) which is then edited in a conventional manner, such as with the above-described NLE. The 2D media rendered from the 3D animation is treated as any other 2D source material, such as digital video, and can be combined with such other source material, as desired by the director.

If the director requires a change to the 2D rendering of the 3D animation, for example to have a character walk past a fixed background at a faster rate, or to have the contents of the 3D animation composited together in a different order, the director must instruct an animation artist as to what is desired and the animation artist will then invoke the required animation tools to modify the animation and to re-render it to 2D media. This new 2D material would then be provided to the director to replace the previous material.

While these techniques have provided reasonable results in the past, it is desired to have a method and system of editing and/or modifying 3D animations which is easier to employ, more efficient than prior art editing techniques and which provides a flexible creative environment for directors, editors and artists.

SUMMARY OF THE INVENTION

It is an object of the present invention to provide a novel system and method of editing and modifying 3D animations.

The present invention provides a method and system for editing and modifying animation information which reduces or removes the barriers between a director and the source material he is working with. Conventionally, with 2D video, which can include 2D renderings of 3D animations, NLE systems are used to edit existing source information. Essentially, the director creating the final edit is only able to select, arrange and apply effects to source information which has already been created. If additional source information is required, the director must undertake to have such additional information created, by filming new scenes, etc. and there is thus a barrier between the director and his work. The present inventors have determined that an NLE which is used to edit source material from 3D animations need not be so limited and that the barrier experienced with such conventional systems can be mitigated. Specifically, the present inventors have created a system and method for the editing and modification of 3D animations which allows an NLE system to integrate the 2D representations which the director is dealing with to the 3D world of the animations. As described below, with the present invention the director or other user of the NLE system can edit and manipulate both 2D renderings of 3D animations in a conventional manner and can also edit, manipulate and re-render those 3D animations as necessary.

According to a first aspect of the present invention, there is provided a computer implemented method for creating and modifying an edit comprising at least 3D animation information, comprising the steps of the user selecting an element from a set of available elements, the element representing 3D animation information which includes at least one parameter, such as a start position, end position, animation speed, etc. The selected element is represented to the user as a clip object which the user can position in a graphical display of the computer relative to a time line. The size of the clip object in the graphical display, relative to the time line corresponds to a duration which is applied to appropriate ones of the parameters in the element and the edges of the clip object relative to the time line represent a start time and an end time each of which are also applied to appropriate ones of the parameters of the element. The computer accesses the animation information in accordance with the information applied to the parameters, to create the edit by compositing together each element. Modifications to the edit can be achieved by the user repositioning and/or resizing the clip objects, the computer applying the corresponding changes to the appropriate parameters and re-compositing the edit, and by removing, adding or substituting elements which will be composited into the edit.

According to another aspect of the present invention, there is provided a computer implemented non-linear editing system for creating and modifying edits comprising at least 3D animations, comprising: a storage device to store elements including animation information and parameters which relate to the animation information; a computer operatively connected to the storage device to access the elements; one or more output devices to display to a user a graphical user interface of an NLE, including a time line, and to display the result of an edit produced with one or more of the stored elements which are composited together to form the edit. The system also includes at least one user input device with which the user can: select at least one element from a list of said elements stored on said storage device; define the positioning, relative to the time line, of a clip object representing the selected element, the start time, end time and duration of the animation produced from the element being determined by the positioning and sizing of the clip object relative to the time line. The computer accesses each element in correspondence with the positioning and sizing of its respective clip object, and composites the elements together to produce the edit. When a user repositions and/or resizes one or more clip objects, the changes to the start time, end time and duration of the elements corresponding to the changes made to the clips are applied the appropriate parameters of the elements and the computer re-accesses and composites the elements together according to the new values of the parameters.

BRIEF DESCRIPTION OF THE DRAWINGS

Preferred embodiments of the present invention will now be described, by way of example only, with reference to the attached Figures, in which.

DETAILED DESCRIPTION OF THE INVENTION

Figure 1:
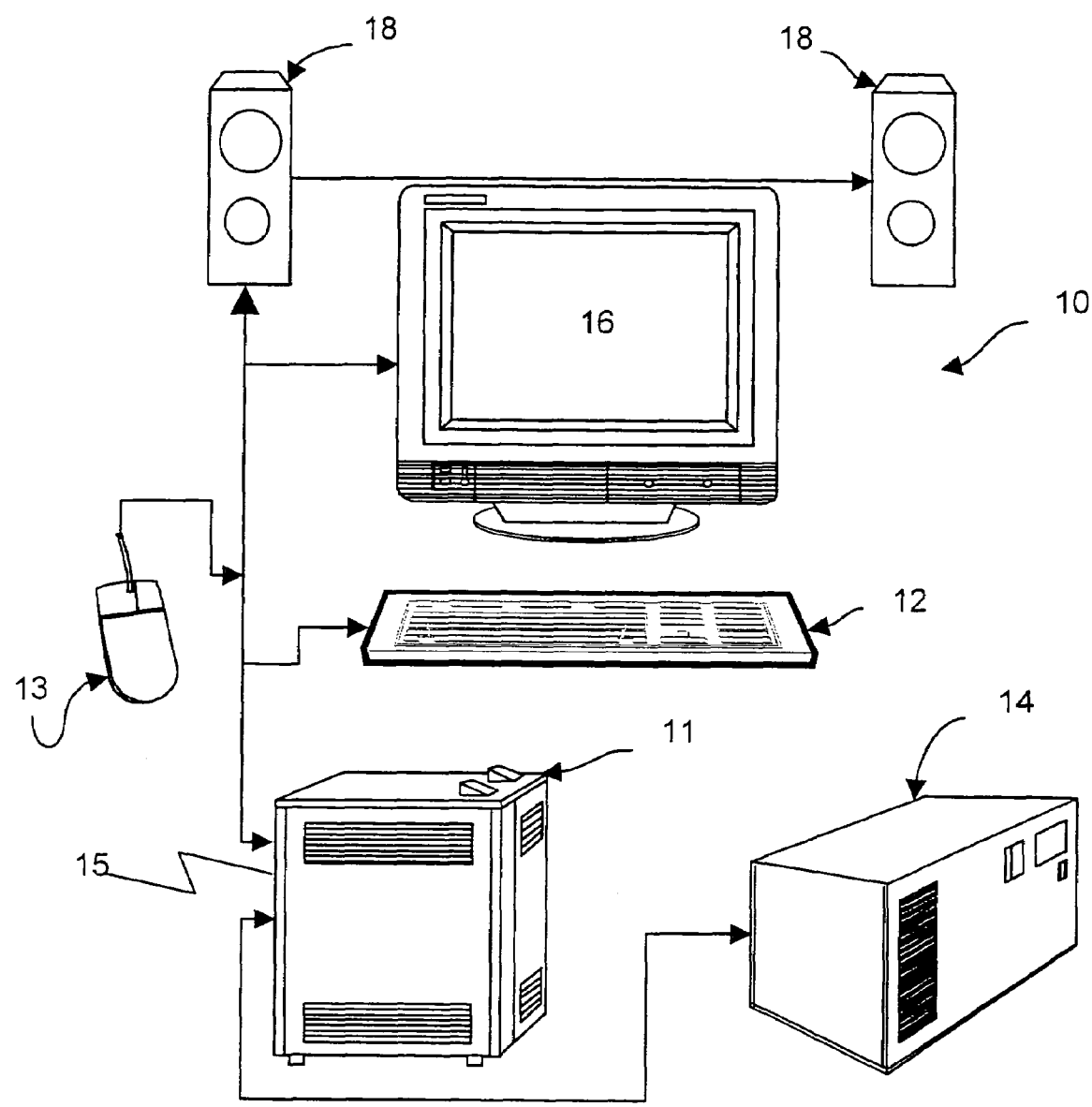
FIG. 1 shows a representation of an NLE system in accordance with the present invention.

FIG. 1 shows an example of an NLE system 10 in accordance with an embodiment of the present invention. System 10 includes a computer which, for example, can be a general purpose computer system 11 such as a PC with an Intel Pentium processor and executing Microsoft Windows NT operating system, or a special purpose computer system, and which execute a series of program steps to provide an NLE-based system for editing and modifying 3D animations. Computer system 11 is connected to one or more user input devices, such as keyboard 12, mouse 13, or any other suitable user input device such as a graphics tablet (not shown), etc. While computer system 11 will generally include a non-volatile storage device, additional data storage for storing source information, edits in progress and final edits can be provided by a storage device such as RAID array 14, optical disc drives (not shown), digital or analog video or audio tape recorders, etc.

As will be apparent to those of skill in the art, computer system 11 can be directly connected to storage devices, such as RAID array 14, and/or be connected to storage devices via a suitable communications link, such as LAN network connection 15, via the internet, etc. System 10 also includes one or more output devices, such as high resolution monitor 16, sound system 18, etc. and their related I/O cards (not shown). In the embodiment of FIG. 1, the graphical user interface (GUI), described further below, of the NLE system and the outputs of the edit being produced are each displayed, either simultaneously or alternately, on monitor 16 with any associated sound track being output by sound system 18. It is also contemplated however, that in some circumstances more than one monitor 16 may be provided to allow output to be displayed on one or more monitors while the GUI of the NLE system is displayed on another.

Figure 2:
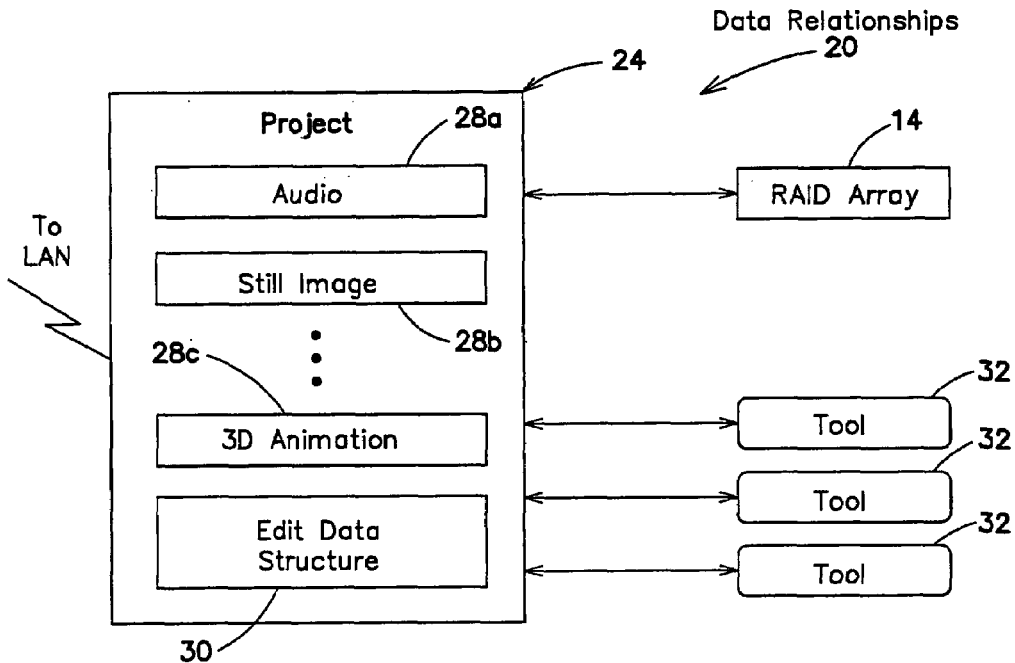
FIG. 2 shows a block diagram of a data structure of the NLE system of FIG. 1.

FIG. 2 is a block diagram of the data relationships 20 of a non-linear editing (NLE) system, in accordance with the present invention. In the following discussion, an edit created by NLE system 10 is referred to as a project 24. A project 24 comprises a series of elements 28, such as video, audio, still image, static 3D information and/or 3D animations which can be combined within project 24 and then rendered, mixed and/or composited to produce the final edit. In the Figure, three elements 28 are shown: first element 28*a* can be audio information, second element 28*b* can be information for a still image and third element 28*c* can be information for a three-dimensional animated character. As is indicated in the Figure, project 24 can include more than three elements 28 and can include, for example, multiple elements of audio, video and/or 3D animation, still images and static 3D objects. Further, as will be described below, elements 28 of project 24 can also themselves be projects. Further, each element 28 can also have one or more defined associations with appropriate tools 32, as discussed in more detail below. In addition to elements 28, project 24 includes an edit data structure 30 which maintains the interrelationships, defined by the user with system 10, between elements 28 to produce the final edit and which maintains the associations between elements 28 and the appropriate tools 32.

Project 24 can include elements 28 which utilise source information from storage devices, such as RAID Array 14, digital video or audio tapes, etc., and project 24 can itself be stored on storage devices such as RAID Array 14, storage devices connected to computer system 11 by network connection 15, etc.

Tools 32 can include an animation program, such as the SoftImage|3D product sold by the assignee of the present invention, or components thereof, compositing systems, one or more rendering engines, such as the "mental ray" rendering engine included with the above-mentioned SoftImage|3D product. etc. As is known by those of skill in the art, the choice of rendering engine depends on the desired quality, speed, resolution and other related factors and those of skill in the art will understand the similar considerations to be made in selecting other tools 32. As mentioned above, each element 28 can have an association with one or more appropriate tools 32. For example, an element 28 which includes animation information for a 3D animated character can have a defined association to the animation component of the above-mentioned SoftImage|3D product which allows system 10 to invoke tool 32, as necessary, to modify the animation information. These Associations can be defined in a variety of manners as will occur to those of skill in the art and can, for example, be defined according to extensions to filenames storing the information, defined according to storage locations, i.e.—a subdirectory can be provided for animations, a different subdirectory can be provided for still images, defined explicitly for the information by the user, etc.

Figure 3:
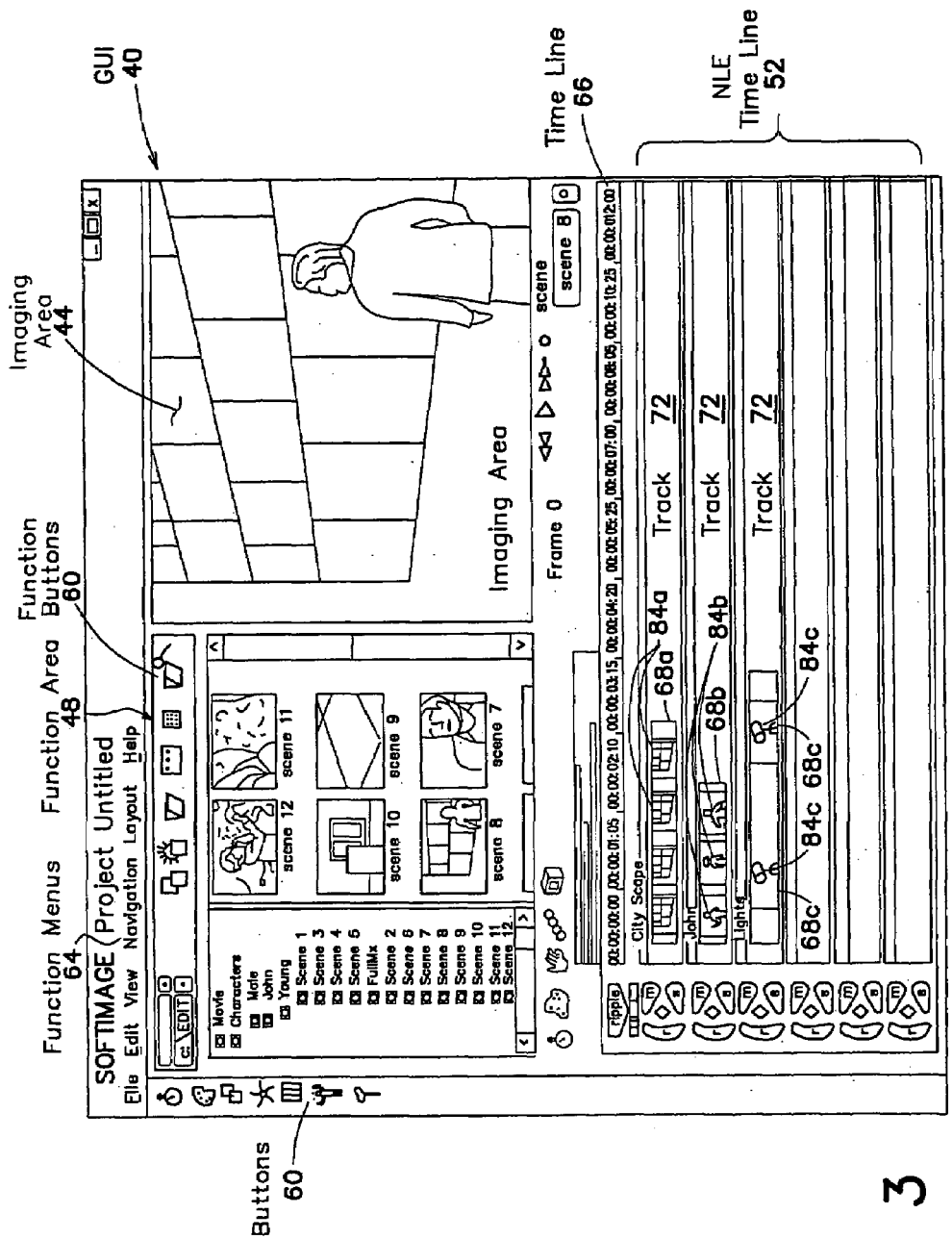
FIG. 3 shows a graphical user interface of the system of FIG. 1.

A user interacts with NLE system 10 through an NLE graphical user interface (GUI) 40, an embodiment of which is shown in FIG. 3. As shown, GUI 40 consists of an imaging area 44, function area 48 and an NLE time line area 52. Imaging area 44 can be a portion of a monitor screen or it can be a separate monitor, such as a high resolution monitor and imaging area 44 can display the contents of visual (video, still image, animations, etc.) clips, or portions of those clips, the visual output of the complete current edit, etc. Similarly, sound system 18 can output the contents of audio (music, narration, sound effects, etc.) clips, or portions of those clips, the audio output of the complete current edit, etc. In this manner, a director can review the contents of clips, crop or otherwise edit them as appropriate (described below) and view the results.

Function area 48 consists of, for example, function buttons 60 and function menus 64 associated with a particular tool 32, if such a tool is active, or with system 10. It is contemplated that, in many circumstances wherein a tool 32 is accessed to modify a clip, via the association defined between the clip and the tool 32, function area 48 will be updated to display at least a subset of the commonly used functions and operators of that tool 32. For example, in an animation application, the functions can include shading, scaling, predefined movements, and other effects, as well as general file retrieval and the like.

If no specific tool 32 has been invoked, function area 48 displays functions and operators relating to system 10 and this can include an Explorer-style browser, as shown in the Figure, which allows a user to select projects of interest, such as the illustrated Scenes 7 through 12, or available clips to be operated on with system 10.

Figure 4:
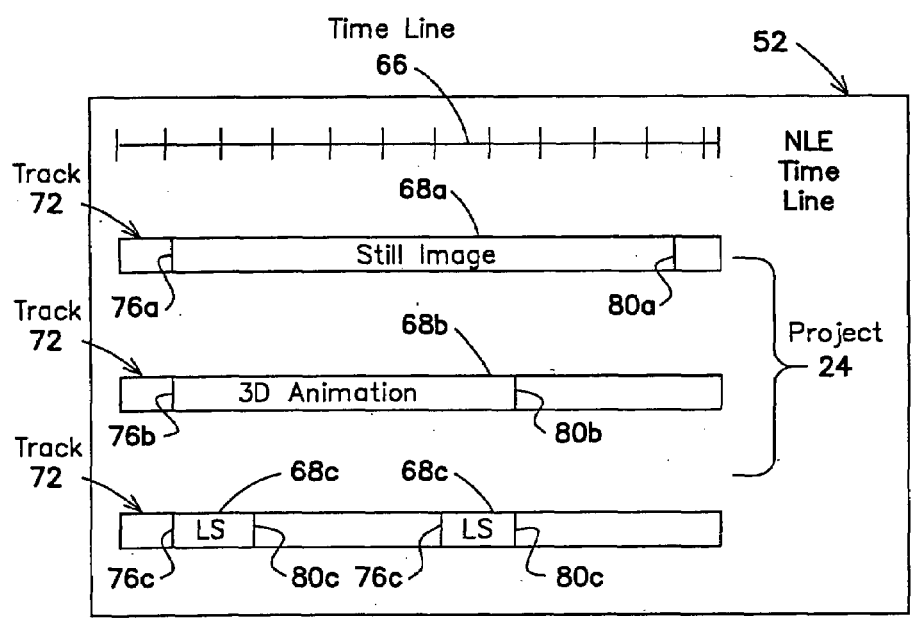
FIG. 4 shows an enlarged schematic view of the time line area of FIG. 3.

NLE time line area 52 is shown schematically in FIG. 4 and thumbnails 84 have been omitted for clarity. NLE time line area 52 displays a project 24 for "Scene 8" of FIG. 3 in graphical form in relation to a time line 66 where time advances from left to right. Elements 28 are displayed as separate rectangular clips 68, each in a track 72. As described above for elements 28, clips 68a, 68b and 68c can comprise audio information, video information, still image information (such as a background scene) or static 3D information (such as a 3D set through which an animated character walks) and animated 3D object information, such as an animated character or other model, respectively. In the specific time line for the project "Scene 8" shown in FIGS. 3 and 4, clip 68a represents an element 28a of a still image background, clip 68b represents an element 28b of an animated 3D character, in this case a man, and clip 68c represents an element 28c of a light source.

In this specific example, element 28a can have an association defined with a paint tool 32, to allow an editor to modify the still image, and to a rendering engine tool 32 so that element 28a can be included by the rendering engine tool, should it become necessary to re-render the project as a result of changes to elements 28 made within system 10.

Each clip 68, and the underlying element 28 that it is associated with, have certain features in common. Each clip 68 is represented by a two-dimensional rectangular box, and each has, in relation to time line 66, a start point 76 and an end point 80 defining a duration therebetween. The start point 76, end point 80 and duration of each clip 68 is mapped to appropriate points in the corresponding element 28 which can be larger in total duration than the duration specified by its corresponding clip 68. Each track 72 can have more than one clip 68, or more than one instance of the same clip, as shown in the Figures wherein two clips 68c are shown in one track. When two instances of a clip are included, they can be either repeated, overlapping or different portions of the total duration of the element 28 associated with the clip 68.

While the concepts of NLE-type editors are known for video and audio, the present invention employs the NLE metaphor to edit and modify 3D animation information, effectively providing a convenient and efficient 2D link to 3D information.

As shown in FIG. 3, in a presently preferred aspect of the invention each clip 68 can also have associated with it thumbnails 84 which are preferably graphic representations, or icons, representing the content of the clip, although they can also be a textual description or both. When graphical representations or icons are employed, these thumbnails can indicate the change or evolution in the underlying information over time, if any. For example, the thumbnail 84a, which shows an icon of a background, represents the information in element 28a. The information in clip 28a does not change over time, therefore, a single repeating thumbnail is sufficient to represent the information. By contrast, thumbnails 84b on clip 68b, are changing icons representing the state of the information in element 28b which is associated with a 3D animation of the character "John" who walks as the animation proceeds. Clip 68c represents an element 28c which, in this example, comprises information relating to a light source to be included in the rendering of the project and, in this specific example, clip 68c occurs twice along time line 66 so that the light source has two separate durations. This has the effect that the light is "on", i.e.—included in any rendering of the animation, for a first duration within the edit and "off", i.e.—not included in the rendering of the animation, for a subsequent duration within the edit and then "on" again for another duration of the edit.

To produce an edit and/or to modify the information in an element 28, a user modifies or operates upon the corresponding clips 68 in the NLE time line area 52. A user can select elements to be included in an edit from a list of available elements presented in the browser of function area 48. The user can drag a desired element from this list and drop it onto a track 72 where it will be represented by a clip 68. A user can change the duration of a clip 68 by scaling clip 68 to the desired length. This can be accomplished in a wide variety of manners, as will be understood by those of skill in the art, including well known "dragging" operations wherein a user clicks on either the start or ending edge of clip 68 with an input device such as mouse 13 and drags the edge to the desired new position. Similarly, a clip 68 can be moved along its associated track 72 to change its start point 76 and end point 80 with respect to time line 66 using keystroke combinations, mouse manipulation, or by any other suitable means as will occur to those of skill in the art. If a clip is shortened, the duration of the source information in corresponding element 28a which is used in the project is reduced. If a clip 68 is shifted to the left, with respect to time line 66, the source information in corresponding element 28 is used earlier within the project than before.

Unlike clips representing 2D or 1D information, clip 68b represents 3D animation information, and can be manipulated via NLE system 10 in an enhanced manner, either as a 2D rendering of the 3D animation, if appropriate, or as 3D information which can be manipulated and subsequently re-rendered, if appropriate. For example, clip 68b can be lengthened to increase its duration, as with clips for 2D or 1D information, but this can result in element 28b being re-rendered from 3D information to a 2D representation. Specifically, if element 28b represents an animated 3D model of a bipedal character, such as "John", walking from left to right, lengthening clip 68b can result in a decrease of the speed at which the character walks, or an increase in the distance travelled, depending on animation parameters included with the animation information in element 28b.

Figure 5:
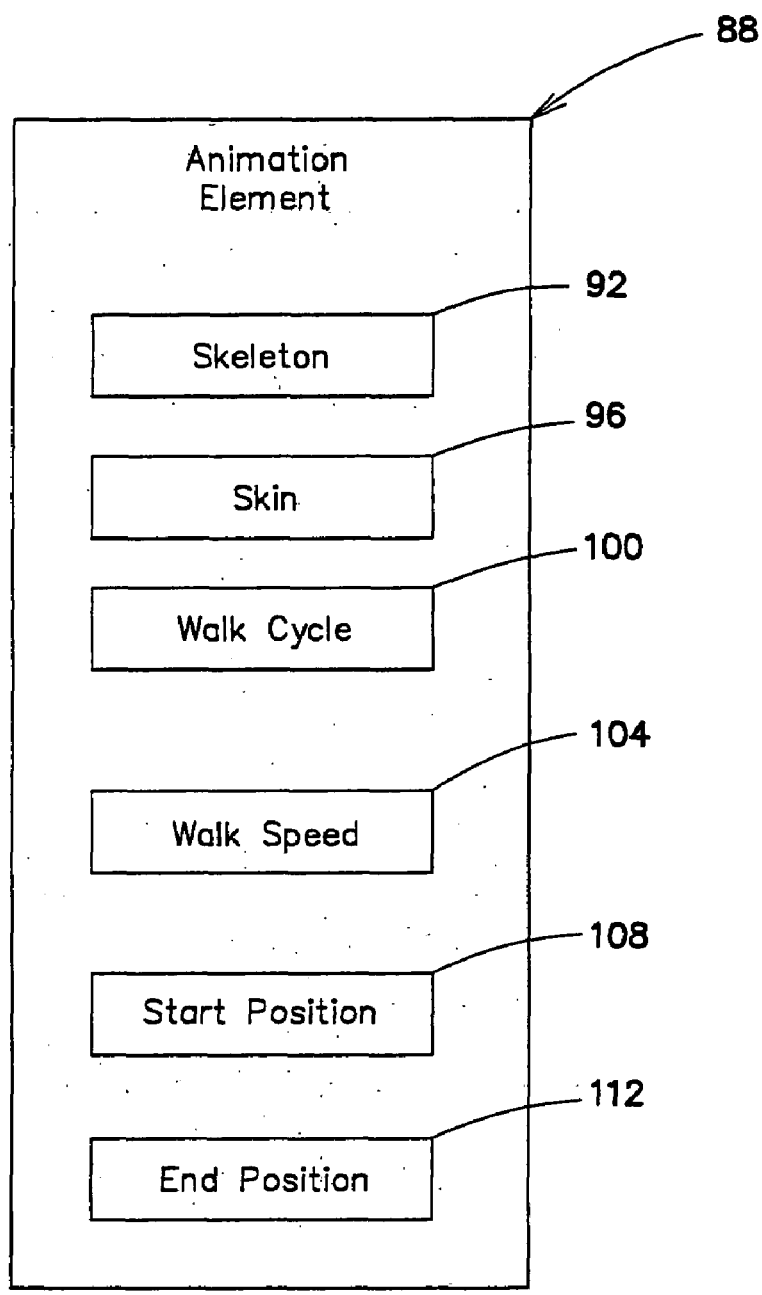
FIG. 5 is a block diagram of an animation element in accordance with the present invention.

The term "animation parameters", as used herein, is intended to comprise the various components which define an animation element. Animation parameters can be either fixed, i.e.—not being directly changeable via the NLE, or modifiable. i.e.—able to be modified via the NLE. For example, FIG. 5 depicts an animation element 88 for an animated figure walking in a left to right direction. Animation element 88 includes a skeleton parameter 92 comprising the definition of an articulated chain hierarchy and a flexible envelope, or skin, parameter 96 which is applied to skeleton parameter 92. Both the skeleton parameter 92 and flexible envelope parameter 96 are fixed.

When fixed parameters require modification by an animator, the NLE does allow the animator to invoke the required tool 32, as specified by the associations for element 88, as needed. For example, if an animator wishes to modify the articulated chain hierarchy of skeleton parameter 92, a modelling tool 32 can be invoked from the NLE time line, via a suitable user input event such as double-clicking on the clip, and the skeleton modified as desired. In such a case, Function area 48 can be updated to display at least a subset of the commonly used functions and operators of the modelling tool 32.

A fixed repeated walk cycle parameter 100 can be defined for a repeatable sequence of skeletal articulations necessary to produce a continuous walking motion for the animated figure represented by element 88. In addition, a walking speed parameter 104, a start position parameter 108 and an end position parameter 112 can be defined and set as modifiable parameters associated with the fixed parameters. In some cases, animation parameters are inherently set as being of fixed or modifiable type. For example, the skeleton, flexible envelope and similar parameters can be inherently set as being fixed types as these parameters will not be modified by a director/user in the normal course of creating an edit. Similarly, parameters relating to speed, position and other like factors can inherently be set as being of modifiable types as these parameters will commonly be modified by a director/user in the normal course of creating an edit. In any event, each parameter will have at least one appropriate tool 32 associated with it to permit modification of the parameter. Further, each parameter can explicitly be set by a user as being fixed or modifiable, if such should be desired, by any appropriate user input.

In the NLE of the present invention, element 88 is represented as a clip, such as clip 68b, which can be modified in a variety of manners. For example, if the clip for element 88 is lengthened this indicates that the duration of the animation is to be increased. However, the animation corresponding to element 88 can be lengthened in at least two manners. For example, speed parameter 104 can be decreased and start position parameter 108 and end position parameter 112 held constant, with the result that the character in the clip walks the distance between the start and end position with a slower gait, i.e.—the animated character covers the same distance within the increased duration of the clip. Alternatively, speed parameter 104 can be held constant and the position of either start position 108 or end position 112, corresponding to which end of the clip is altered, is moved to increase the distance travelled by the animated character within the increased duration of the clip.

If the duration of a clip is shortened, corresponding results can be obtained whereby speed parameter 104 is increased, so that the animated character walks the same distance between the start and end positions within the shortened duration, or the start or end positions can be modified so that the animated character walks less distance in the shortened duration.

It is further contemplated that animation elements 28 can have default conditions defined by the animator for modification of duration or for other modifications. For example, in the above-mentioned example of a character walking between a start and end position, the default condition can be to extend beyond the start and end positions, i.e.—to start walking from a position before the start position and/or to walk toward a position beyond the end position. Other appropriate default conditions can be defined for animations, as will occur to those of skill in the art. In this manner, duration or other modifications can result in modifications to the animation in a manner defined by the animator as being appropriate for the particular animation. It is contemplated that the definition of default conditions can be performed, in any suitable manner including the completion of a default condition dialog box by an animator as an explicit step when the animation information is defined, or when the animation information is first used in system 10.

The actual techniques employed to indicate which method of increasing or decreasing the duration of element 88 is desired are not particularly limited. For example, selecting the clip representing element 88 with a left mouse button can correspond to maintaining the start and end position fixed and changing the speed while selecting the same clip with the right mouse button can correspond to maintaining the speed constant and modifying the start or end position. Other suitable methods for specifying the mapping of changes to a clip to parameters in the corresponding element will be apparent to those of skill in the art.

A modified animation clip may have to be re-rendered to provide a sequence of animation frames in accordance with the desired modification to its animation parameters. In the examples above, where the duration of a clip is increased or decreased, the number and/or content of the frames in the modified element will change and must be re-rendered unless the modification was limited to the discarding of a portion of the animation or the employing of additional frames, previously rendered and stored. Re-rendering of animations in response to modifications can be performed in real time or can be deferred until an appropriate selected time, for example after multiple modifications have been performed and it is desired to view the results. Re-rendering can be performed by one or more rendering engine tools 32 associated with the element requiring re-rendering.

As mentioned above, in addition to modifying the length or position of a clip, the fixed animation parameters of an element can be modified by opening the element, such as by double-clicking on it with a mouse, to invoke an associated tool 32 to access and/or modify the fixed parameters. Further, new fixed or modifiable parameters can be added to a clip by, for example, dragging and dropping functions from function area 48 onto a clip. For example, various effect functions can be provided to modify the result of the animation. A JITTER function can be applied to an animation to add random noise to the motions therein to "jiggle" the rendered animation or a CHARCOAL function can be applied to the animation to give the rendered animation the appearance of having been drawn as a charcoal sketch. Effects or functions can be applied to any clip or to an entire project and can thus affect part of the final edit produced with the present invention or the entire final edit.

In addition to modifying the parameters of any given element in a project, a user may also modify the relationship between elements in a project, and add, subtract or substitute elements within a project. In particular, an edit can be performed with low quality elements, for speed and performance considerations, or elements which are merely placeholders for information which is not yet available. Once the information becomes available or a final edit is required at a different quality level, the various elements in the project can be replaced by the desired elements without requiring any other effort on the part of the animator. In such a case, the user can select one or more desired elements from a list of available elements presented in the browser in Function area 48 and drag and drop the desired element on top of the clip representing the placeholder or different quality element in a track 72 in NLE time line area 52. When a desired clip is dropped onto a clip already in a track 72, the desired clip replaces the clip already in the track, and the start time, end time and duration of the desired clip are set to those of the clip previously in place. Also, any effects or filters which were applied to the clip previously in place are automatically applied to the desired clip.

Further, referring to FIGS. 3 and 4, in a present embodiment of the invention the relationship, or layering, of elements in a project is determined by the order in which tracks 72 are displayed within NLE 40. The elements are composited together in the order in which they are displayed from top to bottom, the uppermost element thus forming a first composited layer with successive tracks being composited in respective order as successive layers. Thus, re-ordering the tracks 72 will result in a comparable change to the order in which elements are composited together. It is contemplated that any other suitable means of ordering the layering of elements, such as explicitly assigning a layer to each element, can also be employed if desired and, in such cases, the ordering of tracks 72 in NLE time line area 52 is independent of the compositing order.

Subtracting an element from a project is simply accomplished by removing it from its track and optionally, if it is the only element on its track, removing its track. Adding an element involves dropping an element from a list of available elements or from another track onto an existing track and/or adding a new track to receive the element, as appropriate. Similarly, substituting an element can be accomplished by dropping a new element onto an existing element in a track, as described above.

A special instance of an element in the present invention is a camera. Essentially, a camera is a viewpoint from which a scene is to be rendered. Multiple cameras can be defined for a 3D animation, to allow a director to cut between different viewpoints, and cameras can have positions which change, i.e.—the camera follows a defined path, or is constrained to move with another object, i.e.—the camera can be mounted on the shoulder of an animated character. Camera elements are represented as clips in tracks, like other elements in the NLE system of the present invention, but are principally manipulated by selecting between the available cameras. In some instances, a camera can follow an animated path and manipulation of the clip representing such a camera element can be used to alter the camera's speed along the path. Like other elements in the present invention, if the director should wish to change a camera element in a manner requiring the use of an animation tool, such as changing the path followed by a camera or changing the object to which it is constrained, the associated tool can be invoked from within the NLE system.

The present inventors believe that one of the particular advantages of the present invention is the use of an NLE to manipulate 3D information from a 2D representation thereof. For example, if a 3D animation of a rock music concert is to be produced, the animation artists can have created an element representing the stage (i.e.—a static 3D object); elements representing each of the animated 3D musicians (i.e.—three guitarists and a drummer); an element representing a background (i.e.—a still image of a sky with clouds in it); and an element representing an animated 3D blimp flying over the stage.

In the NLE system in accordance with the present invention, each of these elements can have a track associated with it and the elements are displayed as clips relative to the time line for the edit. While the static elements of the animation, such as the stage, are not manipulated to any great extent within the NLE system, the animated elements can be manipulated as desired. For example, the animators can have defined the 3D animations of the musicians such that the drummer walks onto the stage from the left side and sits down at his drums and begins to drum. A first guitarist runs onto the stage from the right side, picks up his guitar and starts to play. A second guitarist leaps onto the stage from the left side, runs to his guitar, picks it up and begins to play. The third guitarist runs onto the stage from the right side, stops at the center of the stage and bows to the audience and then turns to pick up his guitar and begins to play. Each musician is defined as an animated bipedal model by the animation artists.

In this example, using the NLE system in accordance with the present invention, the director can change when the various events occur, i.e.—how long after the drummer starts to play that the first guitarist walks onto the stage, by positioning or repositioning the start of the respective clip elements at different points on the time line. The director can change the duration of events, i.e.—how long it requires the drummer to walk across the stage to his drums or how long the third guitarist bows to the audience, by lengthening or shortening the clips to speed up or slow down the animated movement. The director can also re-arrange the compositing of the musician models on the stage, moving the drummer from the back of the stage to the front of the stage, etc. by re-ordering the tracks in the NLE system. The director can also select various cameras from which to view the animation, i.e.—the viewpoint can switch between a camera which is constrained to the moving blimp object, and which provides an aerial view of the stage, and a camera showing a front view of the stage. The director can also turn light sources on or off or otherwise modify them.

Unlike prior art NLE systems, in the examples above the director can actually manipulate the 3D information, via 2D information displayed in the NLE system, to obtain the desired final 2D rendering of the animation. As will be apparent to those of skill in the art, some manipulations of the 2D information displayed in the NLE system will require re-rendering of portions of the animation. For example, slowing the drummer's walk to his drum set will require re-rendering that portion of the animation of the drummer to add the additional frames required. However, as will also be apparent, this will not require re-rendering of unaffected portions of the total animation, i.e.—changing the speed at which the drummer walks does not require re-rendering of the guitarists, although it may require repositioning their clips with respect to the time line. As will be apparent to those of skill in the art, selecting a duration of an element which is less than the entire duration already rendered (i.e.—selecting only five seconds of an eight second animation) will not require any re-rendering, nor will subsequently re-selecting some of the unused rendered portion. Other manipulations can require re-rendering, to a different viewpoint for example, or re-compositing of the rendered elements of the animation.

When re-rendering is required, it is contemplated that a variety of techniques are available to deal with this in a user-friendly manner. For example, a limited re-rendering can first be performed to produce updated thumbnails on the clips in the NLE system, to provide quick feedback to the director, and a subsequent complete re-rendering of the changes can be performed in the background, either automatically or when explicitly initiated. It is contemplated that this latter case (full re-rendering only when explicitly initiated) may be desired when the director is experimenting with a final cut and a full rendering is not required until a cut of interest has been produced. Further, wire frame or low quality re-renderings can be performed to provide quick feedback to the director and full re-renderings of the desired quality can be subsequently performed. When the director requires a change which requires an animation tool, such as for example changing the path that the blimp flies over the stage, the appropriate tool will be opened by the NLE system to allow the animator or the director to effect the desired changes.

It will be apparent to those of skill in the art that the present invention offers a director or other user a familiar interface for creating a desired final edit, yet the operations performed by the interface can directly map to 3D animation information, rather than to 2D renderings thereof. It is believed that this provides significant advantages over conventional NLE systems which merely manipulate 2D or 1D information.

Figure 6:
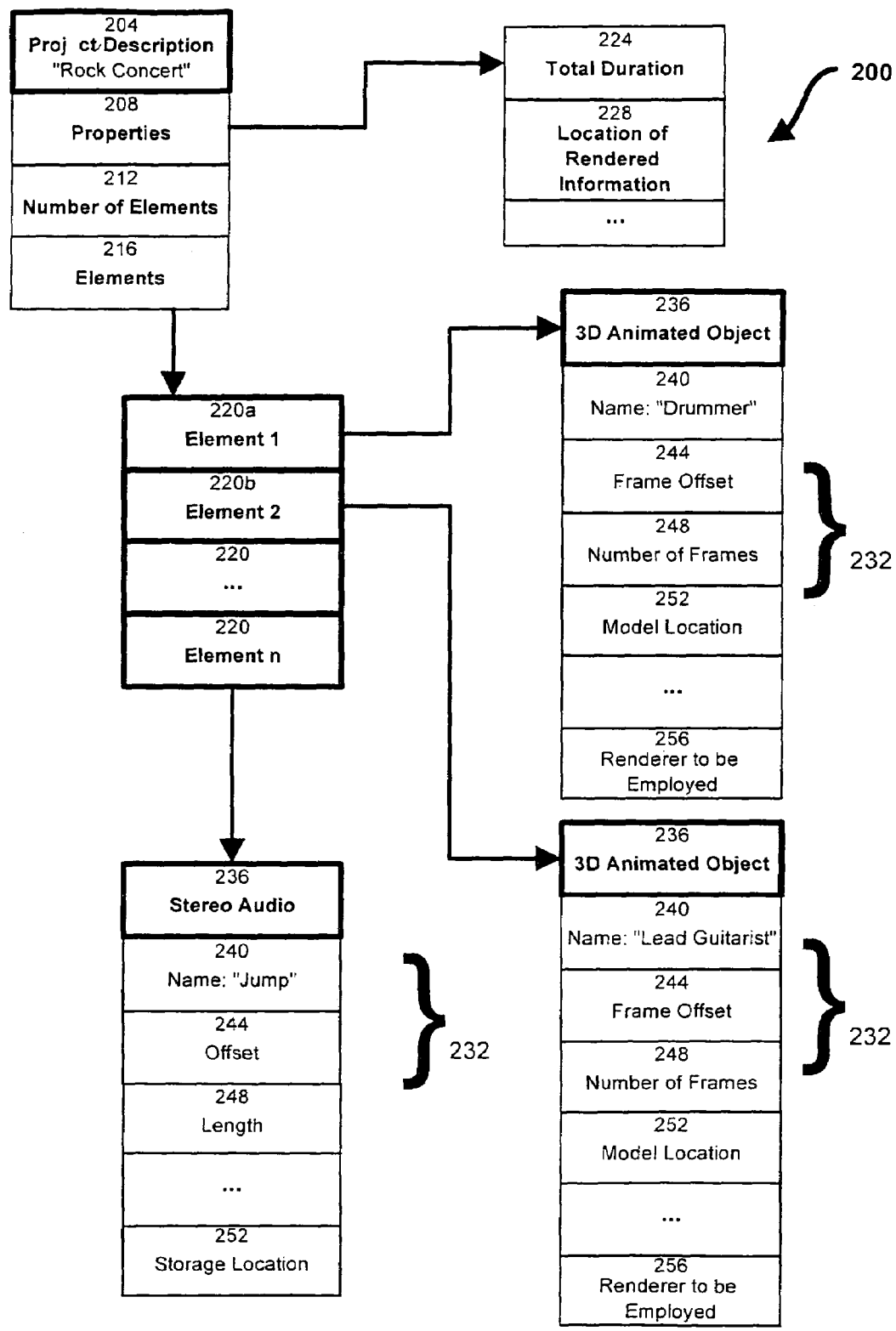
FIG. 6 is a block diagram of a project data structure.

FIG. 6 shows a representation of a data structure 200 for a project. As shown, each project data structure 200 includes a project description 204, in this example "Rock Concert", a pointer 208 to a set of project properties, data 212 representing the number of elements in the project and a pointer 216 to those elements 220.

The project properties contain information relevant to the project as a whole and can include total project duration information 224. This duration information is represented in seconds, microseconds, as a number of frames, etc., as appropriate. The location 228 of the rendered information (video, animation, audio, etc.) and any other relevant information is also present in these properties.

Each element 220 points to an appropriate element data structure 232. Each data structure 232 includes a type identifier 236 which identifies the type of element, i.e.— audio data, video data, still image, 3D animated object, etc., and an element identifier 240 which uniquely identifies that element, i.e.—"lead guitarist", "drummer", the title of the audio track "jump", etc.

Each element also includes an offset 244 which indicates the start of the element relative to the start of the project. For 3D animated objects, this offset is indicated as a number of frames, as is the duration information 248, while for audio information it is indicated as a time or as a number of samples, as appropriate. Location information 252 indicates where the relevant information is located, including the model definition and animation parameters for a 3D object, the storage location for audio or video information, etc. Additional information 256, such as a preferred rendering engine and other associations, can also be maintained as appropriate.

As mentioned above, it is also contemplated that projects can themselves be elements of a project. That is, a first project can be created and edited as above and then inserted as an element in a larger project. In the larger project, the first project will be represented as a clip which can be expanded to show the corresponding parameters in an NLE and modified as described above or which can be manipulated as a single clip within the larger product in a similar manner to any other clip. For example, in the above-mentioned Rock Concert animation example, the third guitarist's walking on to the stage can comprise one element, his bow to the audience a second element and his playing his guitar a third element. These three elements can be combined into a single project which is then incorporated into the Rock Concert project. If it is desired to modify or otherwise manipulate the individual elements of the third guitarist's actions, the third guitarist project is opened to access the tracks of the individual elements. Once the desired modifications have been effected, the tracks of the third guitarist's actions can be collapsed again to a project which is represented as a single clip in the overall project of the Rock Concert. This single clip can also be operated on to alter the start time of the third guitarist project (i.e.—to change when he walks onto the stage), or otherwise manipulated as desired.

Though this discussion has focused on modifying 3D animation information, it will be appreciated that the present invention can apply to any other type of information which can be defined as an element having parameters. As each element in a project is independent and can be modified and, if necessary, re-rendered independently of other elements in the project, a variety of elements from different information sources can be edited simultaneously within a single consistent user interface. It will also be apparent that the present invention can be employed in combination with 2D or 1D information as desired. For example, an audio soundtrack can be edited for the rock concert example given above and/or video (such as actual filmed crowd scenes) can be included in the compositing of the final cut.

It will be apparent to those skilled in the art that the foregoing is by way of example only. Modifications, variations and alterations may be made to the described embodiments without departing from the scope of the invention which is defined solely in the claims.

What is claimed:

1. A computer program product, comprising:
computer program instructions stored on the computer readable medium that, when processed by a computer, instruct the computer to perform a method for implementing a graphical user interface for editing a three-dimensional animation comprising an animation element with associated animation parameters, wherein the animation parameters define animation of a three-dimensional object over time, the method comprising:
displaying a clip object corresponding to the animation element, wherein the clip object is displayed in a track in a timeline and has a start position and an end position relative to said timeline, wherein the start position and the end position define a duration of the clip object, wherein the duration of the clip object defines the animation parameters associated with the animation element;

rendering the animation element to produce a first rendered sequence of two dimensional animation frames in accordance with the animation parameters as defined by the duration of the clip object;

compositing the first rendered sequence of two-dimensional animation frames with at least one other clip object representing another sequence of two-dimensional frames to produce a representation of the three-dimensional animation;

allowing a user to modify the duration of the clip object corresponding to the animation element by manipulating at least one of the start position and the end position of the clip object, whereby the animation parameters associated with the animation element corresponding to the clip object are modified according to the modified duration of the clip object;

rendering the animation element corresponding to the clip object in accordance with the animation parameters as defined by any modification to the duration of the clip object to produce a second rendered sequence of two dimensional animation frames; and compositing the second rendered sequence of two-dimensional animation frames with the at least one other clip object representing the other sequence of two-dimensional frames to produce a representation of the three-dimensional animation.

2. The computer program product of claim 1, wherein the three dimensional object is defined by information defining a skeleton and skin of the three dimensional object in three dimensions and the animation is defined by position and motion information of the three dimensional object in three dimensions.

3. The computer program product of claim 2, wherein the method further comprises modifying the animation parameters according to the modified duration of the clip object such that speed of the three dimensional object in the animation is modified.

4. The computer program product of claim 3, wherein the method further comprises modifying the animation parameters according to the modified duration of the clip object such that a position of the three dimensional object in the animation is modified.

5. The computer program product of claim 1, wherein the method further comprises modifying the animation parameters according to the modified duration of the clip object such that speed of the three dimensional object in the animation is modified.

6. The computer program product of claim 5, wherein the method further comprises modifying the animation parameters according to the modified duration of the clip object such that a position of the three dimensional object in the animation is modified.

7. The computer program product of claim 1, wherein the method further comprises modifying the animation parameters according to the modified duration of the clip object such that a position of the three dimensional object in the animation is modified.

* * * * *